(12) United States Patent
Jeon et al.

(10) Patent No.: US 7,884,162 B2
(45) Date of Patent: Feb. 8, 2011

(54) COPOLYMER COMPRISING ALKENE, ACRYLATE AND UNSATURATED ACID ANHYDRIDE, AND METHOD FOR PREPARING THE SAME

(75) Inventors: Byoung-Ho Jeon, Deajeon Metropolitan (KR); Yoo-Young Jung, Ansan-si (KR); Ki-Su Ro, Daejeon Metropolitan (KR); Kyung-Seop Noh, Daejeon Metropolitan (KR); Bae-Kun Shin, Incheon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/451,423

(22) PCT Filed: May 15, 2008

(86) PCT No.: PCT/KR2008/002700

§ 371 (c)(1),
(2), (4) Date: Nov. 12, 2009

(87) PCT Pub. No.: WO2008/140264

PCT Pub. Date: Nov. 20, 2008

(65) Prior Publication Data

US 2010/0130706 A1    May 27, 2010

(30) Foreign Application Priority Data

May 16, 2007    (KR) .................... 10-2007-0047525

(51) Int. Cl.
*C08F 4/18* (2006.01)
*C08F 4/12* (2006.01)
*C08F 222/04* (2006.01)

(52) U.S. Cl. .................... 526/107; 526/194; 526/195; 526/226; 526/272

(58) Field of Classification Search ................ 526/107, 526/194, 195, 226, 272
See application file for complete search history.

(56) References Cited

U.S. PATENT DOCUMENTS

| | | | |
|---|---|---|---|
| 3,326,871 A | 6/1967 | Shepard et al. |
| 3,904,588 A | 9/1975 | Greene |
| 4,584,348 A | 4/1986 | Nagano |
| 4,908,411 A | 3/1990 | Kinoshita et al. |
| 5,202,193 A | 4/1993 | Sumi et al. |
| 6,368,537 B1 | 4/2002 | Sato et al. |
| 6,703,445 B2 | 3/2004 | Suzuki |

FOREIGN PATENT DOCUMENTS

| | | | |
|---|---|---|---|
| JP | 61-126120 | | 6/1986 |
| JP | 01-156309 | | 6/1989 |
| JP | 01156309 A | * | 6/1989 |
| JP | 04-198308 | | 7/1992 |
| JP | 06-145435 | | 5/1994 |
| WO | WO 2005/010059 | | 2/2005 |

* cited by examiner

*Primary Examiner*—Michael M Bernshteyn
(74) *Attorney, Agent, or Firm*—McKenna Long & Aldridge LLP

(57) ABSTRACT

The present invention provides a copolymer that includes at least one alkene monomer, at least one acrylate monomer and at least one the unsaturated acid anhydride monomer, and a method of preparing the same.

17 Claims, 3 Drawing Sheets

[Fig. 1]
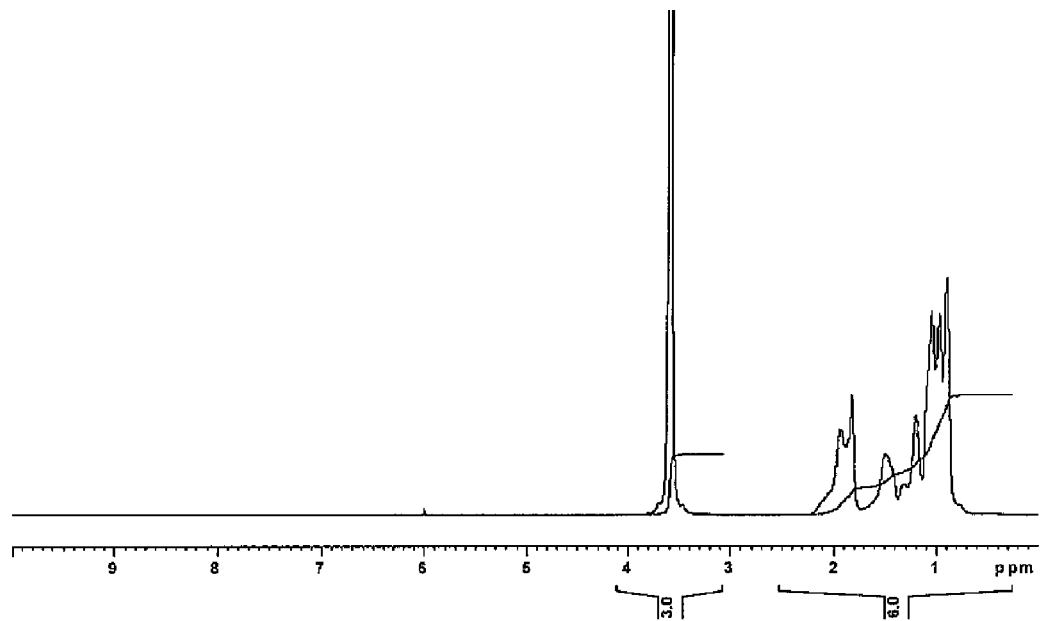
[Fig. 2]
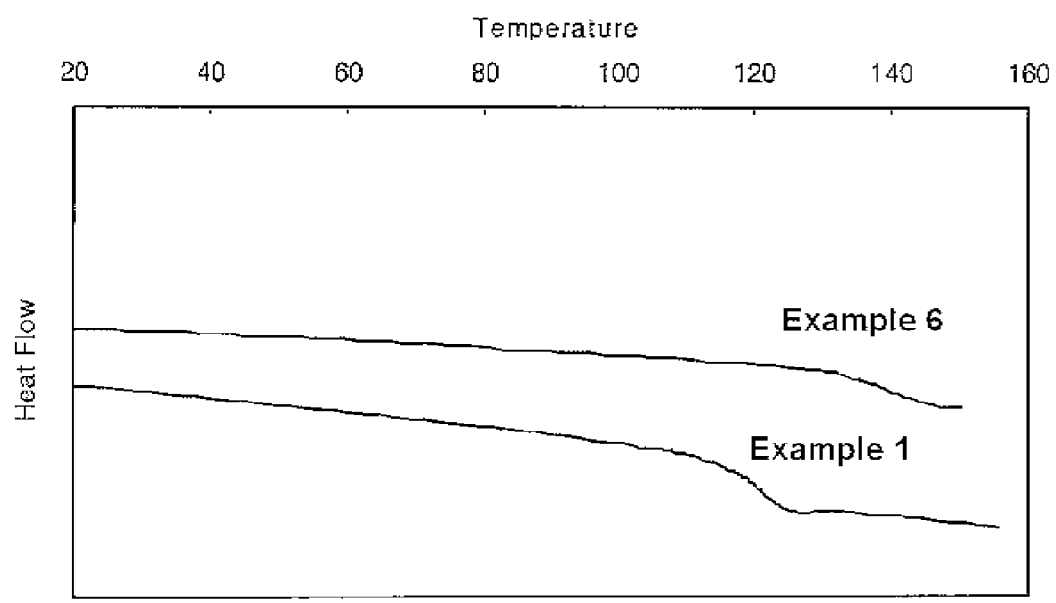

[Fig. 3]
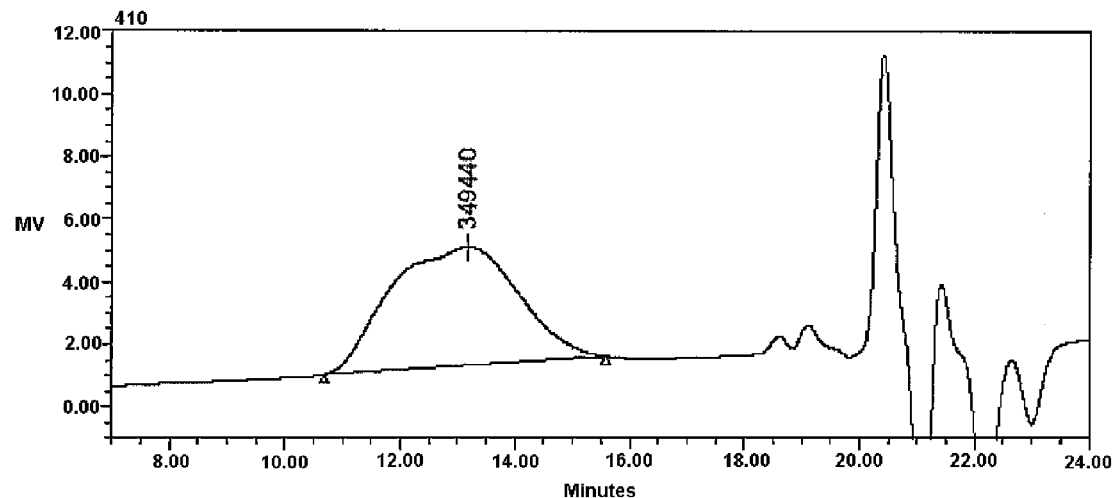
[Fig. 4]
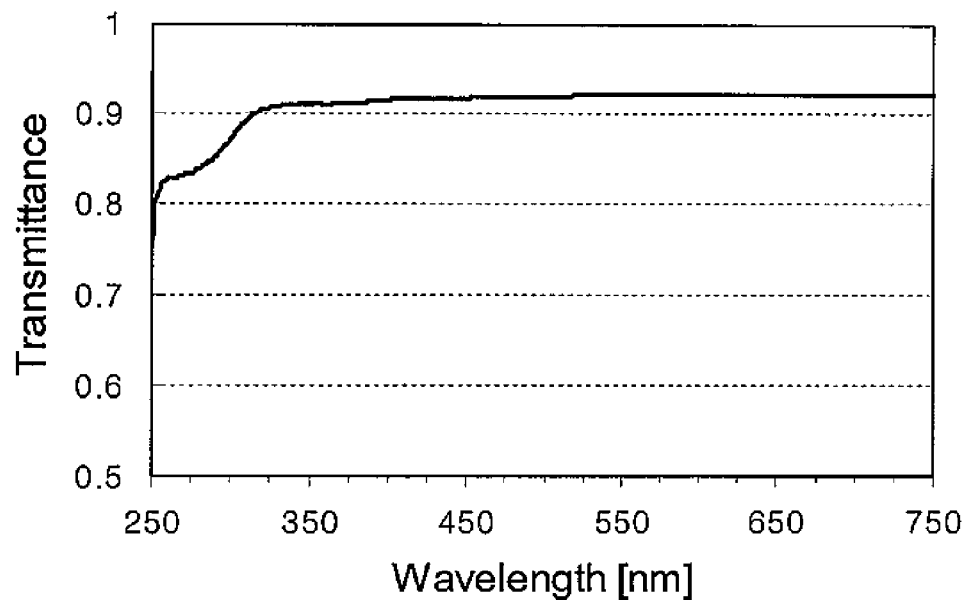
[Fig. 5]
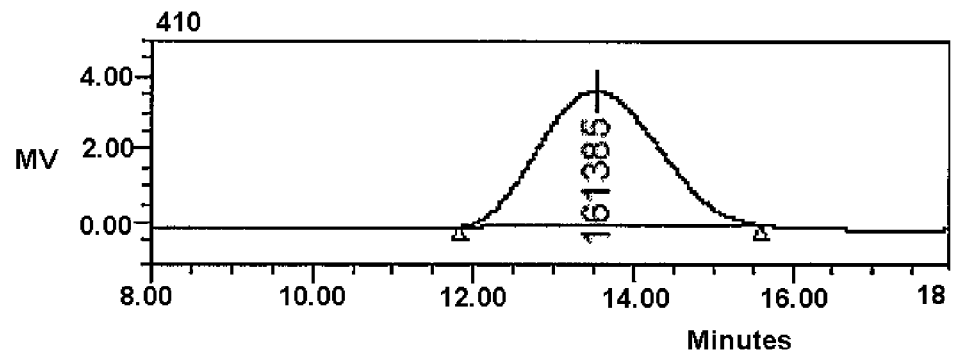

[Fig. 6]
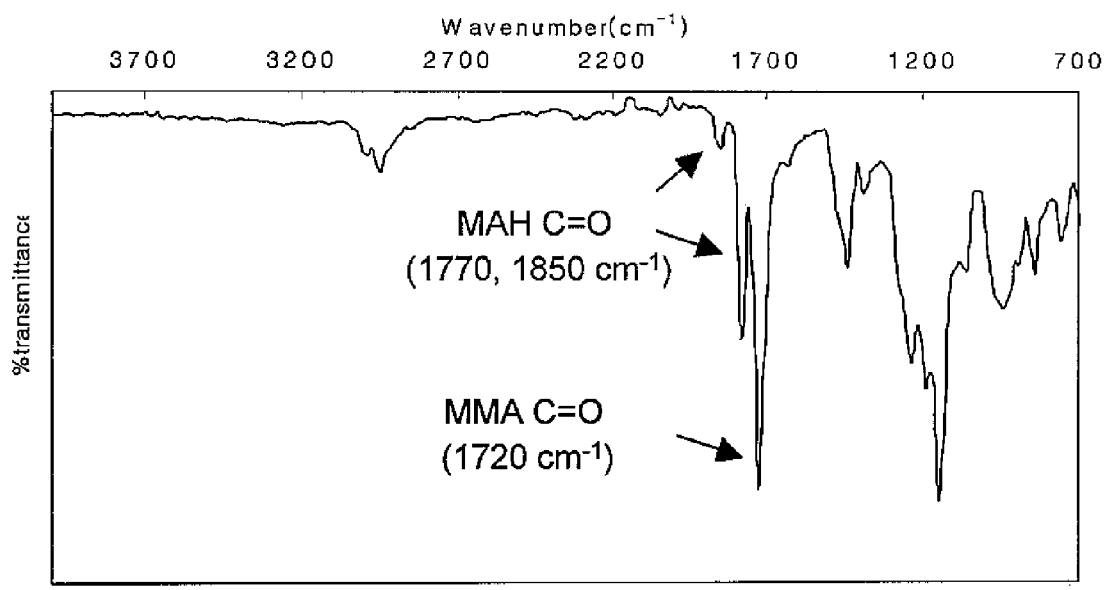
[Fig. 7]
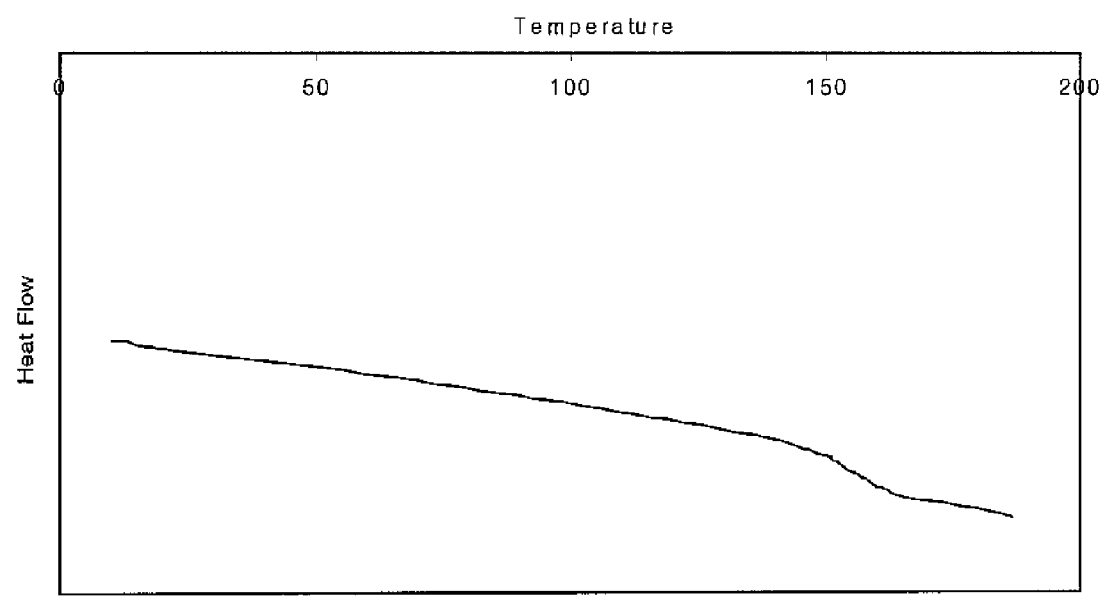

COPOLYMER COMPRISING ALKENE, ACRYLATE AND UNSATURATED ACID ANHYDRIDE, AND METHOD FOR PREPARING THE SAME

This application claims the benefit of PCT/KR2008/002700 filed on May 15, 2008 and Korean Patent Application No. 10-2007-0047525 filed on May 16, 2007, both of which are hereby incorporated herein by reference for all purposes in their entirety.

TECHNICAL FIELD

The present invention relates to a novel copolymer and a method of manufacturing the same. More particularly, the present invention relates to a novel copolymer that has the excellent transparency, mechanical property, adhesion property and heat resistance and can be applied to various types of optical materials, and a method of manufacturing the same. This application claims priority from Korea Patent Application No. 10-2007-0047525 filed on May 16, 2007 in the KIPO, the disclosure of which is incorporated herein by reference in its entirety.

BACKGROUND ART

In the case of when alkene, in particular, ethylene is subjected to the copolymerization in conjunction with an alkyl (meth)acrylate comonomer, a polymer that has physical properties different from those of typical polyethylene may be formed. For example, the adhesion strength, properties such as the low temperature toughness and the like may be significantly improved as the content of comonomer(s) is increased. Accordingly, the much development of the copolymer including 1-alkene and the other comonomers mixed with each other has been made.

In a related art, the copolymer of ethylene and alkyl acrylate or ethylene and alkyl methacrylate is obtained by using the high temperature and high pressure reaction. Thus, the reaction by simultaneously adding ethylene and an acryl monomer by using a tube type of reactor or an autoclave reactor under the severe condition of 1000 atm or more and 100° C. or more is disclosed. The polymer that is obtained under this condition is a copolymer polymerized by using the acryl monomer that is the polar monomer in an amount of 3 to 35% based on ethylene.

However, in order to ensure the high temperature and high pressure condition, an additional apparatus such as a primary compressor, a secondary compressor, and a special reactor is required to ensure safety of operators. In addition, due to the severe process condition, there are many condition limits when the composition of the copolymer is to be changed in a desired direction.

In addition, the ethylene copolymer that is manufactured by using a known method includes few polar groups. That is, since the content of polar monomer is not high, the crystallinity of polyethylene remains in the copolymer. Thus, there is a limit in use of the copolymer in an optical material such as a transparent film. Accordingly, in respects to the polymer that is obtained according to the known high temperature and high pressure method by using tube type of reactor or autoclave, products that do not affect the transparency have been mainly developed.

Accordingly, there is a need to develop a novel method of manufacturing a polar copolymer that has no crystallinity due to the high content of polar comonomer without the high temperature and high pressure severe polymerization condition.

Meanwhile, a method of copolymerizing vinyl monomers in olefin by using a metal complex compound catalyst is known. However, due to the high affinity in respects to oxygen of the metal, the metal complex compound catalyst on the basis of an initial transition metal and a lanthanide metal is disadvantageous in that the catalyst is easily contaminated by a functional group (C=O) of the polar vinyl monomer. In respects to a metal complex compound catalyst system on the basis of a latter transition metal, the high possibility of the copolymerization of alkyl acrylate and olefin is reported, but the content of olefin is still very high.

In order to overcome the disadvantage of the metal complex compound catalyst polymerization method in which the metal complex compound catalyst is contaminated due to oxygen that is present in the polar group, thus reducing the activity and forming a polymer having the low content of polar groups, the controlled radical polymerization has been suggested. In the case of when olefin and the polar vinyl monomers are subjected to the copolymerization by using the ATRP (Atom Transfer Radical Polymerization) that is the representative method of the controlled radical polymerization, the content of the polar vinyl monomer is higher than the content of olefin unlike the metal complex compound catalyst polymerization. That is, it is possible to synthesize a random copolymer in which the content of olefin is appropriately controlled according to the polymerization condition. However, in the case of when the ATRP is used, a long time is required to obtain the high molecular weight, and there is a limit in maintaining the content of olefin at a low level. Since the 1-alkene-acrylate copolymer has the high transparency, the copolymer is usefully applied to an optical material. However, in order to use the copolymer for the above purpose, the excellent heat resistance must be ensured so as to prevent deformation due to heat generated during the manufacturing process and the operation of optical apparatuses. Accordingly, there is a need to develop a novel copolymer in order to improve the physical properties such as the heat resistance and the like.

DISCLOSURE OF INVENTION

Technical Problem

It is an object of the present invention to provide a copolymer that has an amorphous property due to the high content of polar monomers, excellent transparency, adhesion property, and heat resistance, and high adhesion property in respects to the material such as metal. It is another object of the present invention to provide a method of manufacturing a copolymer, in which the polymerization is performed by using an appropriate amount of comonomers used to ensure the physical properties required under the mild reaction condition, a catalyst can be recovered and reused to ensure economic efficiency, and the impurity in the polymer is minimized.

Technical Solution

In order to accomplish the above objects, the present invention provides a copolymer that includes 0.1 to 30 mole % of at least one alkene monomer, 30 to 95 mole % of at least one acrylate monomer, and 0.1 to 40 mole % of at least one unsaturated acid anhydride monomer.

In addition, the present invention provides a method of manufacturing a copolymer, which includes polymerizing at least one alkene monomer 0.1 to 30 mole %, at least one acrylate monomer 30 to 95 mole % and at least one the unsaturated acid anhydride monomer 0.1 to 40 mole % in the presence of a Lewis acid or a metal oxide by using a radical polymerization initiator.

Advantageous Effects

A copolymer according to the present invention is an amorphous polymer that has the high content of polar group, and has the excellent transparency and the improved adhesion property and heat resistance. Therefore, the copolymer can be applied as various types of optical materials. The conventional alkene-acrylate polymer has a disadvantage in that the glass transition temperature decreases as the content of ethylene increases. However, the copolymer according to the present invention has high glass transition temperature of 100 or more degree by comprising the unsaturated acid anhydride so as to be applied to optical materials.

In addition, in a method of manufacturing a copolymer according to the present invention, since a Lewis acid or a metal oxide is used, the polymerization can be performed by using an appropriate amount of alkene monomers used to ensure the physical properties required under the mild reaction condition, in the case of when the metal oxide, the metal oxide can be recovered and reused to ensure economic efficiency, and a problem regarding the impurity in the polymer can be solved. Accordingly, it is possible to manufacture the polymer having the high purity.

BRIEF DESCRIPTION OF THE DRAWINGS

FIG. 1 illustrates a hydrogen nuclear magnetic resonance spectrum ($^1$H-NMR spectrum) of an ethylene-methyl methacrylate random copolymer that is obtained in Comparative Example 2;

FIG. 2 illustrates the differential scanning calorimetry (DSC) analysis results of an ethylene-methyl methacrylate-maleic acid anhydride random copolymer that is obtained in Examples 1 and 6;

FIG. 3 illustrates the gel permeation chromatography (GPC) analysis results of an ethylene-methyl methacrylate-maleic acid anhydride random copolymer that is obtained in Example 2;

FIG. 4 illustrates the UV-Visible spectrum analysis results of the film that is produced by using an ethylene-methyl methacrylate-maleic acid anhydride random copolymer that is obtained in Example 5;

FIG. 5 illustrates the gel permeation chromatography (GPC) analysis results of an ethylene-methyl methacrylate-maleic acid anhydride random copolymer that is obtained in Example 6;

FIG. 6 illustrates the IR spectrum analysis results of an ethylene-methyl methacrylate-maleic acid anhydride random copolymer that is obtained in Example 7; and FIG. 7 illustrates the differential scanning calorimetry (DSC) analysis results of an ethylene-methyl methacrylate-maleic acid anhydride-glycidyl methacrylate random copolymer that is obtained in Example 8.

BEST MODE FOR CARRYING OUT THE INVENTION

Hereinafter, the present invention will be described in detail.

A copolymer according to the present invention includes an alkene monomer, an acrylate monomer, and an unsaturated acid anhydride monomer. In the present invention, it is preferable that the contents of the alkene monomer, the acrylate monomer and the unsaturated acid anhydride monomer be 0.1 to 30 mole %, 30 to 95 mole %, and 0.1 to 40 mole % respectively.

In the present specification, the inclusion of the alkene monomer, acrylate monomer and the unsaturated acid anhydride monomer in the copolymer according to the present invention means that the copolymer according to the present invention is formed by polymerizing the monomers. For convenience of the understanding, the terms of the monomers are used to express the structures thereof. It can be easily understood by those who skilled in the art that the double bonds of the monomers are not present at the main chain of the copolymer according to the present invention.

The glass transition temperature (Tg) of the copolymer according to the present invention is in the range of 80 to 220° C., preferably 100 to 180° C. and more preferably 120 to 180° C. In order to effectively use the copolymer as an optical material, it is preferable that the glass transition temperature be 100° C. or more. In addition, it is preferable that the copolymer according to the present invention have a number average molecular weight in the range of 5,000 to 400,000 and a weight average molecular weight in the range of 10,000 to 800,000. In addition, it is preferable that the copolymer according to the present invention have a temperature at which an initial weight is reduced by half ($Td_{50}$) in the range of 300 to 550° C.

In the present invention, examples of the alkene monomer include, but are not limited to alkenes sixth as 1-alkene that has a double bond at an end of a carbon chain thereof, 2-alkene and 3-alkene that has a double bond at a middle part of a carbon chain thereof, and the like.

Examples of 1-alkene may include ethylene, propylene, 1-butene, 1-pentene, 1-hexene, 1-hepthene, 1-octene, 1-nonen, 1-decene and the like. Examples of alkene that has the double bond at the middle part of the carbon chain thereof may include 2-butene, 2-pentene, 2-hexene, 3-hexene, 2-hepthene, 2-octene, 2-nonen and the like.

In the copolymer, the content of the alkene monomer is in the range of 0.1 to 30 mole % and preferably 10 to 30 mole %. In the case of when the polymer includes only the monomers having the polar group without the alkene monomer, there is a problem in that the formed film is easily broken. In particular, if the content of the alkene monomer in the copolymer is 10 mole % or more, the polymer is not easily broken when the monomer is applied to the layered film of the optical material. However, the alkene monomer may be included in an amount of less than 10 mole % in respects to products that do not require the nonbreaking.

In the present invention, the acrylate monomer may be a compound having a double bond between conjugated carbons and carbonyl group of an ester group, and a substituent group thereof is not limited. In the present specification, it is to be understood that the term "acrylate monomer" means acrylate and an acrylate derivative, and includes alkyl acrylate, alkyl methacrylate, alkyl butacrylate and the like.

Specifically, examples of the acrylate monomer include a compound that is represented by the following Formula 1.

[Formula 1]

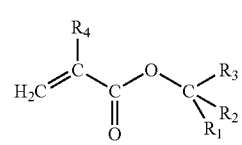

In Formula 1, $R_1$, $R_2$ and $R_3$ are the same or different from each other, and are each independently a hydrogen atom or a monovalent hydrocarbon group that is capable of including a hetero atom and has 1 to 30 carbon atoms, at least one of $R_1$, $R_2$ and $R_3$ may be an epoxy group, and $R_4$ is a hydrogen atom or an alkyl group having 1 to 6 carbon atoms.

In Formula 1, examples of the acrylate monomer in which at least one of $R_1$, $R_2$ and $R_3$ is an epoxy group include glycidyl methacrylate and glycidyl acrylate. In addition, examples of the acrylate monomer include alkyl acrylate including a straight- or branched-chained alkyl group having 1 to 12 carbon atoms, alkyl methacrylate including a straight- or branched-chained alkyl group having 1 to 12 carbon atoms, or alkyl butacrylate including a straight- or branched-chained alkyl group having 1 to 12 carbon atoms.

It is preferable that the content of the acrylate monomer in the copolymer be in the range of 30 to 95 mole %, preferably 40 to 95 mole %, more preferably 50 to 90 mole %, and most preferably 50 to 80 mole %.

In the case of when the content of the acrylate comonomer that is the polar monomer is increased, the crystallinity that is the intrinsic physical property of alkene, particularly 1-alkene such as ethylene, can be prevented. Thus, it is possible to produce an amorphous copolymer. It is difficult to manufacture the amorphous 1-alkene-acrylate copolymer by using a known technology. Since the amorphous copolymer has the high transparency and the excellent adhesion property, it is possible to use the amorphous copolymer as the optical material. In particular, since the amorphous copolymer has many polar functional groups, the copolymer has the excellent adhesion strength in respects to metal or the like. Thus, the copolymer is useful to apply electric devices.

In the above reaction, in the case of when the amount of the acrylate comonomer is less than 30 mole % based on the total amount of the monomers, the adhesion property and the transparency are poor. In the case of when the amount of the acrylate comonomer is more than 95 mole %, there is a problem in that the mechanical property of the polymer decreases and the polymer is easily broken. In addition, in order to apply the copolymer to a layered film for optical materials, the amount of the acrylate monomer is preferably 95 mole % or less and more preferably 90 mole % or less so as to reduce the breaking property during the formation of the film.

In the present invention, the unsaturated acid anhydride has one or more double bonds and can be used to perform radical polymerization by using the double bond. It is to be understood that even though there is no mention regarding the unsaturated acid anhydride in the specification, the unsaturated acid anhydride has one or more double bonds unless otherwise specified. In the present invention, carboxylic acid anhydride may be used as the unsaturated acid anhydride, and monovalent or polyvalent carboxylic acid anhydride may be used. Preferably, maleic anhydride or a derivative thereof may be used, for example, the compound that is represented by the following Formula 2 may be used.

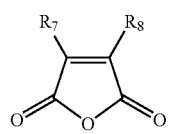

[Formula 2]

In the above Formula, $R_7$ and $R_8$ are each independently a hydrogen atom or an alkyl group having 1 to 6 carbon atoms.

However, the scope of the present invention is not limited to the above examples, maleic anhydrides having different substituent groups or other types of unsaturated acid anhydrides may be used.

In the copolymer, the content of the unsaturated acid anhydride monomer is in the range of 0.1 to 40 mole %, and preferably 10 to 30 mole %. In the case of when the unsaturated acid anhydride monomer is introduced as a component of the copolymer, the copolymer has a high glass transition temperature. Thus, the copolymer may be used as the optical material. In particular, since the copolymer has many polar functional groups, the copolymer has the excellent adhesion strength in respects to metal or the like. Thus, the copolymer is useful to be applied to electric devices.

The copolymer that consists of the repeating units of the above-mentioned monomers may include a repeating unit that is represented by the following Formula 3.

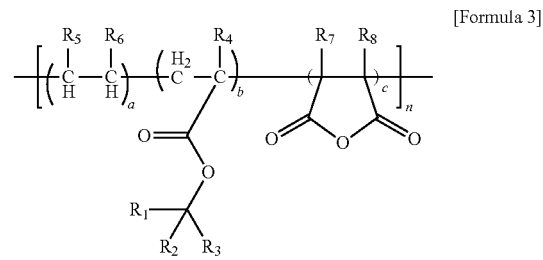

[Formula 3]

In Formula 3, a, b and c are molar ratios, a, b and c are not 0 all at the same time, $R_1$ to $R_4$, $R_7$ and $R_8$ are the same as those of the above, and $R_5$ and $R_6$ is a hydrogen atom or an alkyl group having 1 to 6 carbon atoms.

The copolymer may be a random copolymer. In this case, the copolymer according to the present invention may include various types of repeating units that are represented by Formula 3. In addition, the copolymer may include a block or blocks as long as the transparency is maintained. It is preferable that the copolymer according to the present invention have the transparency of 80% or more during the formation of the film.

Since the copolymer according to the present invention has the high content of polar group, there is no crystallinity in alkene such as ethylene. Thus, a polymer film is formed by using the copolymer according to the present invention is transparent. Additionally, since the copolymer includes the unsaturated acid anhydride, the copolymer has the high glass transition temperature and the improved adhesion property and preferably used for a polarizing plate and an optical film having a multilayered structure.

In addition, the alkene-acrylate-unsaturated and anhydride copolymer according to the present invention may include one type of alkene, one type of acrylate, and one type of unsaturated acid anhydride as the monomer component, and the copolymer may include two or more type of at least one of alkene, acrylate and unsaturated acid anhydride. Particularly, it is preferable that two or more type of acrylate monomers are used and at least one acrylate monomer is alkyl acrylate monomer. Additionally, within the range of the physical properties of the polymer and the object of the present invention, the copolymer may further include a comonomer. Examples of the comonomer may include unsaturated organic acid, maleimides, methyl maleimides, ethyl maleimides, butadiene, styrene and the like. Monovalent or polyvalent carboxylic acid may be used as the unsaturated organic acid.

The copolymer may be manufactured by polymerizing the alkene monomer, the acrylate monomer, and the unsaturated acid anhydride monomer in the presence of the Lewis acid or the metal oxides by using a radical polymerization initiator. In the method of manufacturing the copolymer according to the present invention, the Lewis acid or the metal oxides are used to avoid a high temperature and high pressure severe condition of a known technology. Thus, the process is simple in the manufacturing method. In addition, since all of the used metal oxides may be easily recovered by using only a filtering apparatus after the polymerization and reused, the manufacturing cost can be significantly reduced, the purification can be easily performed, and the copolymer having the high purity can be provided. In addition, since stability in respects to water and air is excellent, the efficiency is high. Since the polymerization process may be simplified, the desirable industrial applicability is ensured.

The metal oxide acts as the Lewis acid that provides an acid site and is included in the Lewis acid in the polymerization reaction. However, in comparison with the typical other Lewis acids, since there are no change in the structure and the composition even after the polymerization reaction, there are additional advantages in that the separation can be easily performed and the reuse can be performed. Thus, in the present specification, for convenience of the understanding, the metal oxide is called the metal oxide or the complex metal oxide so as to be discriminated from the other typical Lewis acids.

It is preferable that the metal oxide be a compound represented by the following Formula 4.

 [Formula 4]

In Formula 4,

M is one or more selected from the group consisting of alkali earth metal, transition metal, Group 13 metal and Group 14 metal;

N is a Group 5 or 6 atom;

O is an oxygen atom; and x, y and z are values that are determined by an oxidation state of M and N with x>0, y≧0, and z>0.

To be more specific, preferable examples of the metal oxide include one or more selected from the group consisting of metal oxides such as aluminum oxide ($Al_2O_3$), yttrium oxide ($Y_2O_3$), zinc oxide ($ZrO_2$), halfnium oxide ($HfO_2$), silicon oxide ($SiO_2$), boron oxide ($B_2O_3$), cesium oxide ($CeO_2$), dysprosium oxide ($Dy_2O_3$), erbium oxide ($Er_2O_3$), europium oxide ($Eu_2O_3$), gadolinium oxide ($Gd_2O_3$), holmium oxide ($Ho_2O_3$), lanthanum oxide ($La_2O_3$), lutetium oxide ($Lu_2O_3$), neodymium oxide ($Nd_2O_3$), praseodymium oxide ($Pr_6O_{11}$), samarium oxide ($Sm_2O_3$), terbium oxide ($Tb_2O_3$), thorium oxide ($Th_4O_7$), thulium oxide ($Tm_2O_3$), ytterbium oxide ($Yb_2O_3$), tin oxide (SnO), and titanium oxide ($TiO_2$), and complex metal oxides such as dysprosium aluminate ($Dy_3Al_5O_{12}$), yttrium aluminate ($Y_3Al_5O_{12}$), aluminum titanate ($Al_2O_3.TiO_2$), aluminum silicate ($3Al_2O_3.2SiO_2$), calcium titanate ($CaTiO_3$), calcium zirconate ($CaZrO_3$), iron titanate ($FeTiO_3$), magnesium aluminate ($MgO.Al_2O_3$), cesium aluminate ($CeAl_{11}O_{18}$), $Al_2(SO_4)_3$, and $AlPO_4$.

Since the metal oxide is a solid type, the metal oxide can be completely recovered by using a physical method using only a filtering apparatus, and the recovered metal oxide can be used to perform the polymerization. The recovered metal oxide may be reused 20 times.

Preferable examples of the Lewis acid include a Lewis acid that includes one or more metal cations selected from the group consisting of scandium, titanium, vanadium, chrome, manganese, iron, cobalt, copper, zinc, boron, aluminum, yttrium, zirconium, niobium, molybdenum, cadmium, rhenium and tin, and one or more metal anions selected from the group consisting of halides, triflates, $HPO_3^{2-}$, $H_3PO^{2-}$, $CF_3COO^-$, $C_7H_{15}OSO^{2-}$ and $SO_4^{2-}$. To be more specific, preferable examples of the Lewis acid include aluminum trichloride, scandium triflate, zinc triflate, copper triflate, trifluoro boron, and a mixture thereof.

In the method of manufacturing the copolymer, it is preferable that the metal oxide or the Lewis acid be used in an amount of 0.01 to 200 mole % based on the acrylate comonomer.

Since the metal oxide or the Lewis acid is used, the content of the monomers included as the repeating unit in the manufactured copolymer can be appropriately controlled and adjusted according to the required physical properties. In particular, in the case of when the alkene monomers such as ethylene or propylene that are present in a gas phase under the reaction condition are partially dissolved in a solvent to perform the polymerization reaction, the metal oxide or the Lewis acid can control the amount of the alkene monomer required to ensure the desirable physical properties of the copolymer to be manufactured, and allow the polymerization reaction to be performed at low temperature under low pressure as compared to a known technology.

Preferable examples of the radical polymerization initiator include peroxides, azo compounds and the like. To be more specific, examples of the peroxide compound may include hydrogen peroxide, decanonyl peroxide, t-butyl peroxyneodecanoate, t-butyl peroxypivalate, 3,5,5-trimethylhexanoyl peroxide, diethyl peroxide, t-butylperoxy-2-ethyl hexanoate, t-butylperoxy isobutylate, benzoyl peroxide, t-butylperoxy acetate, t-butylperoxy benzoate, di-t-butyl peroxide, t-amylperoxy neodecanoate, t-amylperoxy pivalate, t-amylperoxy-2-ethyl hexanoate, 1,1,3,3-tetramethylbutyl hydroperoxide, alkali metal persulfate, perborate and percarbonate, and examples of the azo compound may include 2,2'-azo-bis (isobutyronitrile) (AIBN). The preferable initiator is the azo compound. A mixture of the initiators may be used.

The radical polymerization initiator may be added to the reaction stream in an appropriate form, for example, in a pure form, in a form in which the initiator is dissolved in the appropriate solvent, and/or in a mixture form of the monomer or comonomer feed stream and the initiator. It is preferable that the radical polymerization initiator used to manufacture the copolymer be added in an amount of 0.01 to 10 mole % based on the acrylate monomer. However, the amount of the radical polymerization initiator is not limited but may vary if necessary.

It is preferable that the polymerization reaction of the copolymer be performed in the presence of a solvent, in particular, an organic solvent. Preferable examples of the solvent include one or more solvents that are selected from the group consisting of toluene, chlorobenzene, n-hexane, heptane, tetrahydrofuran, ether, methanol, ethanol, chloroform, and methylene chloride, but are not limited thereto. That is, the type of solvent is not limited as long as the solvent is capable of being used in the art to which the present invention belongs.

In the polymerization reaction, since the acrylate monomer and the unsaturated acid anhydride monomer are generally present in a liquid phase under the reaction condition, the acrylate monomer and the unsaturated acid anhydride monomer are dissolved in the solvent to be used in the polymerization reaction. Accordingly, as long as the monomers that are included in the above-mentioned copolymer are present in a liquid phase under the reaction condition, the reaction pressure is not limited.

Meanwhile, in the case of when the alkene monomer is particularly ethylene and propylene, since the alkene monomer is generally present in a gas phase under the reaction condition, in order to include the alkene monomer in the repeating unit of the copolymer according to the present invention in a predetermined amount, the high pressure reaction condition is required. However, in the case of when the alkene monomer is present in a liquid phase under the reaction condition, the reaction pressure is not limited.

Unlike a known technology that requires the severe reaction condition of the high temperature of 100° C. or more and the high pressure of 1000 atm or more, the polymerization reaction may be performed under the mild condition of 200 atm or less and 150° C. or less, and preferably 50 atm or less and 100° C. or less. Thus, the polymerization reaction is a simple process and it is easy to control the physical properties of the manufactured copolymer. In addition, since the metal oxide has excellent stability against moisture, the metal oxide is effective and can be reused.

Specifically, in respects to the reaction condition for polymerization of the copolymer, in the case of when the alkene monomer is present in a gas phase under the reaction condition, it is preferable that the polymerization reaction be performed under pressure in the range of 5 to 200 atm and the temperature condition in the range of 30 to 150° C. In particular, the reaction is performed under pressure in the range of 20 to 50 atm and the temperature condition in the range of 50 to 80° C.

When the polymerization pressure is less than 5 atm, the content of the alkene monomer decreases. When the polymerization pressure is more than 200 atm, additional instruments are required. In addition, when the polymerization temperature is less than 30° C., initiators may not be activated. When the polymerization temperature is more than 150° C., it may be difficult to control the polymerization process.

According to an embodiment of the present invention, ethylene or propylene is used as the alkene monomer, methyl methacrylate or methyl acrylate is used as the acrylate monomer, the maleic anhydride is used as the unsaturated acid anhydride monomer, aluminum oxide is used as the metal oxide, and the polymerization is performed by using AIBN as the polymerization initiator under pressure in the range of 5 to 50 atm and the temperature in the range of 50 to 80° C.

The copolymer according to the present invention has high glass transition temperature and toughness and excellent light transmissivity and adhesion property. Therefore, the copolymer according to the present invention may be used to manufacture an optical film. Since the optical film that includes the copolymer according to the present invention is manufactured by using the copolymer resin that has the high light transmissivity, glass transition temperature, and toughness, the optical film has the high light transmissivity, and the excellent adhesion property due to the high content of the monomer having the polar functional group. Thus, the copolymer is suitable to be used for a layered film such as a polarizing plate. Accordingly, the copolymer may be used to manufacture a retardation compensation film having the birefringence by using the stretching, a polarizing film by the post-treatment using an iodine solution, and various types of optical films.

MODE FOR THE INVENTION

A better understanding of the present invention may be obtained in light of the following Examples which are set forth to illustrate, but are not to be construed to limit the present invention.

The organic agent and the solvent that were required for the polymerization were purified by using the standard method with a product of Aldrich, Co., Ltd. After highly pure ethylene that was manufactured by Applied Gas Technology, Co., Ltd. was passed through by using a water and oxygen filtering apparatus, the polymerization was performed.

In order to obtain the content of the monomer in the copolymer, the spectrum was obtained by using the 500 MHz NMR manufactured by Varian, Co., Ltd. The glass transition temperature (Tg) that was the thermal property of the obtained polymer was measured by using DSC Q100 manufactured by TA Instrument, Corp., and Td_50 (50% thermal decomposition temperature) was measured by using TGA manufactured by TA Instrument, Corp.

Light transmissivity of films was measured by UV spectrometer.

The molecular weight and the molecular weight distribution were obtained by using the analysis of the GPC (gel permeation chromatography) manufactured by Waters, Co., Ltd. The analysis temperature was 25° C., tetrahydrofuran (THF) was used as the solvent, and the standardization was performed by using polystyrene to obtain the number average molecular weight (Mn) and the weight average molecular weight (Mw).

Comparative Example 1

The maleic acid anhydride (MAH) and methyl methacrylate (MMA) were added to the reactor having the volume of 125 mL. In addition, the initiator AIBN that was dissolved in toluene was added thereto. Subsequently, the temperature of the reactor was increased to 65° C. and the polymerization was performed for 18 hours.

Comparative Example 2

After the high pressure reaction apparatus having the volume of 125 mL was vacuumized, argon was charged therein. Methyl methacrylate and alumina were added to the reactor under the argon atmosphere. In addition, AIBN that was the initiator dissolved in toluene was added thereto. Subsequently, ethylene was charged under 35 bar, the temperature of the reactor was increased to 75° C. and the polymerization was performed for 18 hours. The hydrogen NMR spectrum ($^1$H-NMR spectrum) of the obtained ethylene-methyl methacrylate random copolymer is shown in FIG. 1.

Comparative Example 3

The polymerization was performed by using the same method as Comparative Example 2, except that the addition amount of alumina was reduced.

The polymerization conditions and the results of Comparative Examples 1, 2 and 3 are described in Tables 1 and 2. The hydrogen NMR spectrum ($^1$H-NMR spectrum) of the ethylene-methyl methacrylate random copolymer obtained from Comparative Example 2 is shown in FIG. 1.

TABLE 1

| | Reaction addition amount | | | | | Polymerization condition | |
|---|---|---|---|---|---|---|---|
| | [Toluene]/[MMA] | [Lewis acid]/[MMA] | [Initiator]/[MMA] | [MAH]/[MMA] | Ethylene | | |
| | (volume ratio) | (molar ratio) | (molar ratio) | (molar ratio) | pressure (bar) | Temperature (° C.) | Time (h) |
| Comparative Example 1 | 6 | 0 | 0.002 | 1 | 0 | 65 | 18 |
| Comparative Example 2 | 9 | 1 | 0.003 | 0 | 35 | 75 | 18 |
| Comparative Example 3 | 9 | 0.2 | 0.003 | 0 | 35 | 75 | 18 |

TABLE 2

| | Composition of polymer | | | Physical properties of polymer | | | |
|---|---|---|---|---|---|---|---|
| | MAH content | MMA content | Ethylene content | | | | |
| | (mol %) | (mol %) | (mol %) | Tg (° C.) | Mw | PDI | $Td_{50}$ (° C.) |
| Comparative Example 1 | 41 | 59 | 0 | 142.4 | 251000 | 2.9 | 370.6 |
| Comparative Example 2 | 0 | 80 | 20 | 80 | 49000 | 1.64 | 433 |
| Comparative Example 3 | 0 | 90.3 | 9.7 | 111.2 | 71700 | 1.42 | 427 |

Comparative Example 1 relates to the production of a random copolymer of maleic acid anhydride (MAH) and methyl methacrylate (MMA), and since the copolymer has the high glass transition temperature, the copolymer has high heat resistance. However, since the copolymer is brittle, it is difficult to form a film by using the copolymer.

Comparative Examples 2 and 3 relate to an ethylene-methyl methacrylate random copolymer. As the test results of Comparative Example 2, the ethylene-methyl methacrylate random copolymer having the ethylene content of 20 mole % was polymerized. Comparative Example 3 relates to the result regarding the free radical polymerization while the addition amount of alumina was reduced as compared to the polymerization condition of Comparative Example 2, and the ethylene-methyl methacrylate random copolymer having the ethylene content of 9.7 mole % which was lower as compared to Comparative Example 2 was polymerized. In Comparative Example 3, since the content of ethylene was reduced, the glass transition temperature was increased as compared to that of Comparative Example 2. However, there was a disadvantage in that since the content of ethylene was low, the film was easily broken during the production of the film.

From the results, it can be seen that the addition of alumina increases the content of ethylene in the copolymer, and if the content of ethylene is increased, the glass transition temperature is reduced. In the polymers of Comparative Example 2, since the content of ethylene was about 10 mole % or more, it is possible to manufacture the optical film having the high transparency and the excellent shapability. However, since the glass transition temperature was 100° C. or less, there is a disadvantage in that the heat resistance is undesirable to apply the polymer to the optical film. That is, when the content of ethylene is increased, the property of acrylate regarding easy breaking can be compensated to contribute to the formation of the film, but the applicability thereof is limited due to the low glass transition temperature.

Example 1

After the high pressure reaction apparatus having the volume of 125 mL of Parr was vacuumized, argon was charged therein. Methyl methacrylate (MMA), maleic acid anhydride (MAH), and alumina as the Lewis acid were added to the reactor under the argon atmosphere. In addition, AIBN that was the initiator dissolved in toluene was added thereto. Subsequently, ethylene was charged under 35 bar, the temperature of the reactor was increased to 65° C. and the polymerization was performed for 18 hours.

After the polymerization was finished, alumina was removed from the polymerization solution by using the filter, and the polymerization solution was precipitated in ethanol or hexane. The obtained polymer was dried at the temperature of Tg or less under reduced pressure for 24 hours.

Example 2

The polymerization was performed by using the same method as Example 1, except that the amount of solvent was controlled.

Example 3

The polymerization was performed by using the same method as Example 1, except that the mixed solvent of toluene/THF=3 (volume ratio) was used as the solvent.

Example 4

The polymerization was performed by using the same method as Example 1, except that the mixed solvent of hexane/THF=3 (volume ratio) was used as the solvent.

Examples 5 to 7

Tetrahydrofurane (THF) was used as the solvent, the polymerization was performed under the conditions in which the amount of the solvent, the temperature, and time were the same as those of Example 1 but the type of metal oxides was changed.

The polymerization conditions and the results of Examples 1 to 7 are described in Tables 3 and 4. In addition, FIG. 2 illustrates the differential scanning calorimetry (DSC) graph of an ethylene-methyl methacrylate-maleic acid anhydride random copolymer that is obtained in Examples 1 and 6, FIG. 3 illustrates the gel permeation chromatography (GPC) analysis results of an ethylene-methyl methacrylate-maleic acid anhydride random copolymer that is obtained in Example 2, FIG. 4 illustrates the UV-Visible spectrum analysis results of an ethylene-methyl methacrylate-maleic aid anhydride random copolymer that is obtained in Example 5, FIG. 5 illustrates the gel permeation chromatography (GPC) analysis results of an ethylene-methyl methacrylate-maleic acid anhydride random copolymer that is obtained in Example 6, FIG. 6 illustrates the IR spectrum analysis results of an ethylene-methyl methacrylate-maleic acid anhydride random copolymer that is obtained in Example 7.

mal decomposition temperature that was measured by the TGA was 400° C. or more which was high. As the content of the ethylene was increased, the glass transition temperature was reduced, and as the content of maleic acid anhydride and acrylate was increased, the glass transition temperature was in creased. Thus, the polymer having the desired heat resistance and physical properties can be synthesized according to the change in polymerization condition.

As the results of Examples 5 to 7, various metal oxides are applied, and in the case of when tetrahydrofurane was used as the solvent, the solubility of the polymer formed was higher than the case of when the toluene was used, thus, the molecular weight distribution was narrow.

Examples 8 to 11

The polymerization was performed by using the same method as Examples 1 to 7, and two types of acrylates were used to perform 4-membered copolymerization. Alkyl acrylate or glycidyl methacrylate which was substituted with the epoxy group was used as the fourth monomer. That is, in addition to methyl methacrylate, maleic acid anhydride, and ethylene, each of methyl acrylate (MA), ethyl acrylate (EA), and glycidyl methacrylate (GMA) was added as the monomer

TABLE 3

| | | | | Reaction addition amount | | | | | |
|---|---|---|---|---|---|---|---|---|---|
| | | [Solvent]/ [MMA] | Type of | [Lewis acid]/[MMA] | [Initiator]/[MMA] | [MAH]/[MMA] | Ethylene | Polymerization condition | |
| | Type of solvent | (volume ratio) | Lewis acid | (molar ratio) | (molar ratio) | (molar ratio) | pressure (bar) | Temperature (° C.) | Time (h) |
| Example 1 | Toluene | 10 | Alumina | 1 | 0.002 | 0.25 | 35 | 65 | 18 |
| Example 2 | Toluene | 6 | Alumina | 1 | 0.002 | 0.25 | 35 | 65 | 18 |
| Example 3 | Toluene/THF | 10 | Alumina | 1 | 0.002 | 0.25 | 35 | 65 | 18 |
| Example 4 | Hexane/THF | 10 | Alumina | 1 | 0.002 | 0.25 | 35 | 65 | 18 |
| Example 5 | THF | 6 | boron oxide | 1 | 0.001 | 0.3 | 35 | 70 | 6 |
| Example 6 | THF | 6 | Titanium oxide | 1 | 0.001 | 0.3 | 35 | 70 | 6 |
| Example 7 | THF | 6 | Zeolite | 1 | 0.001 | 0.5 | 35 | 70 | 6 |

*In Example 3, the mixed solvent of toluene/THF = 3 was used, in Example 4, the mixed solvent of hexane/THF = 3 was used.

TABLE 4

| | Composition of polymer | | | Physical properties of polymer | | | | |
|---|---|---|---|---|---|---|---|---|
| | MAH content (mol %) | MMA content (mol %) | Ethylene content (mol %) | Tg (° C.) | Light transmissivity (% T) | Mw | PDI | $Td_{50}$ (° C.) |
| Example 1 | 23 | 62 | 15 | 120.9 | 89 | 303000 | 2.91 | 423.4 |
| Example 2 | 22 | 66 | 12 | 122.8 | 89 | 813000 | 2.93 | 400.7 |
| Example 3 | 19 | 63 | 18 | 118.7 | 90 | 220100 | 2.38 | 430.2 |
| Example 4 | 20 | 65 | 15 | 125.3 | 91 | 456200 | 2.77 | 404 |
| Example 5 | 31 | 50 | 19 | 132.5 | 92 | 173000 | 2.1 | 431 |
| Example 6 | 28 | 51 | 21 | 138.1 | 90 | 196000 | 1.7 | 422 |
| Example 7 | 39 | 47 | 14 | 141.9 | 91 | 181000 | 1.91 | 418 |

As the results of Examples 1 to 7, the ethylene-methyl methacrylate-maleic acid anhydride copolymer having the glass transition temperature of about 120° C. or more was synthesized. The low glass transition temperature problem that was the disadvantage of the high transparent film synthesized in Comparative Example was solved, and the 50% therto perform 4-membered copolymerization. The detailed polymerization conditions and the results of Examples 8 to 11 are described in Tables 5 and 6. In addition, FIG. 7 illustrates the differential scanning calorimetry (DSC) analysis results of an ethylene-methyl methacrylate-maleic acid anhydride-glycidyl methacrylate random copolymer that is obtained in Example 8.

TABLE 5

| | Reaction addition amount | | | | | | Polymerization condition | |
|---|---|---|---|---|---|---|---|---|
| | [THF]/[MMA] (volume ratio) | [Lewis acid]/[MMA] (molar ratio) | [Initiator]/ [MMA] (molar ratio) | [MAH]/[MMA] (molar ratio) | Ethylene pressure (bar) | [4th monomer]/[MMA] (molar ratio) | Temperature (° C.) | Time (h) |
| Example 8 | 3 | Alumina 0.5 | 0.001 | 0.3 | 30 | MA 0.1 | 70 | 6 |
| Example 9 | 3 | Alumina 0.5 | 0.001 | 0.3 | 30 | MA 0.2 | 70 | 6 |
| Example 10 | 3 | Alumina 0.5 | 0.001 | 0.3 | 30 | EA 0.2 | 70 | 6 |
| Example 11 | 3 | Alumina 0.5 | 0.001 | 0.3 | 30 | GMA 0.2 | 70 | 6 |

\* The film properties were obtained by measureing the degree of breaking when the film was bent after the polymer was dissolved in THF and the produced film was dried at 70° C. for 1 day. The property was excellent in the case of when the breaking occurs two times or less when the film was bent ten times, and the property was fair in the case of when the breaking occurs five times or less when the film was bent ten times.

TABLE 6

| | Composition of polymer | | | | Physical properties of polymer | | | | |
|---|---|---|---|---|---|---|---|---|---|
| | MAH content (mol %) | MMA content (mol %) | Ethylene content (mol %) | 4th monomer content (mol %) | Tg (° C.) | Light transmissivity (% T) | Mw | PDI | $Td_{50}$ (° C.) |
| Example 8 | 28 | 43 | 9 | MA 6 | 132 | 91 | 235000 | 1.8 | excellent |
| Example 9 | 26 | 47 | 11 | MA 10 | 125 | 91 | 217000 | 1.9 | excellent |
| Example 10 | 24 | 56 | 10 | EA 10 | 118 | 90 | 251000 | 1.9 | excellent |
| Example 11 | 27 | 50 | 11 | GMA 12 | 158 | 90 | 313000 | 2.2 | fair |

As the polymerization results of Examples 8 to 11, when alkyl acrylate was used as the fourth monomer, the properties of the film were more improved. When a small amount of alkyl acrylate was added, it was confirmed that it improved the breaking property in conjunction with ethylene, and as compared to Examples 5 to 7, the molecular weight was increased.

The invention claimed is:

1. An alkene-acrylate-unsaturated acid anhydride copolymer polymerized by at least one alkene monomer of 0.1 to 30 mole % that is at least one selected from the group consisting of ethylene, propylene, 1-butene, 1-pentene, 1-hexene, 1-hepthene, 1-octene, 1-nonene, and 1-decene; at least one acrylate monomer of 40 to 95 mole % that is represented by the following Formula 1; and at least one unsaturated acid anhydride monomer of 0.1 to 40 mole % that is represented by the following Formula 2:

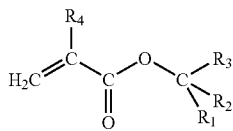

[Formula 1]

wherein $R_1$, $R_2$ and $R_3$ represent each independently a hydrogen atom or a monovalent hydrocarbon group that is capable of including a hetero atom and has 1 to 30 carbon atoms, at least one of $R_1$, $R_2$ and $R_3$ are an epoxy group; and $R_4$ represents a hydrogen atom or an alkyl group having 1 to 6 carbon atoms; and

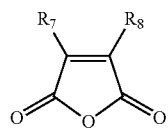

[Formula 2]

wherein $R_7$ and $R_8$ represent a hydrogen atom or an alkyl group having 1 to 6 carbon atoms.

2. The alkene-acrylate-unsaturated acid anhydride copolymer as set forth in claim 1, wherein said acrylate monomer comprises 50 to 90 mole % as repeating unit of the copolymer.

3. The alkene-acrylate-unsaturated acid anhydride copolymer as set forth in claim 1, wherein said copolymer has a glass transition temperature (Tg) in the range of 100 to 180° C.

4. The alkene-acrylate-unsaturated acid anhydride copolymer as set forth in claim 1, wherein said copolymer has a number average molecular weight in the range of 5,000 to 400,000 or a weight average molecular weight in the range of 10,000 to 800,000.

5. The alkene-acrylate-unsaturated acid anhydride copolymer as set forth in claim 1, wherein said acrylate monomer comprises alkyl acrylate including a straight- or branched-chained alkyl group having 1 to 12 carbon atoms, alkyl methacrylate including a straight- or branched-chained alkyl group having 1 to 12 carbon atoms, or alkyl butacrylate including a straight- or branched-chained alkyl group having 1 to 12 carbon atoms.

6. The alkene-acrylate-unsaturated acid anhydride copolymer as set forth in claim 1, wherein said copolymer be used for an optical film.

7. A method of preparing an alkene-arcylate-unsaturated acid anhydride copolymer, the method comprising:
polymerizing the following monomers by using a radical polymerization initiator and a metal oxide, in which the monomers include at least one alkene monomer of 0.1 to 30 mole % that is at least one selected from the group consisting of ethylene, propylene, 1-butene, 1-pentene, 1-hexene, 1-hepthene, 1-octene, 1-nonene, and 1-decene; at least one acrylate monomer of 40 to 95 mole % that is represented by the following Formula 1; and at least one unsaturated acid anhydride monomer of 0.1 to 40 mole % that is represented by the following Formula 2:

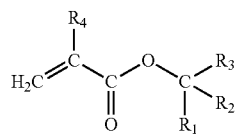

[Formula 1]

wherein $R_1$, $R_2$ and $R_3$ represent each independently a hydrogen atom or a monovalent hydrocarbon group of 1 to 30 carbon atoms that is capable of including a hetero atom; and $R_4$ represent a hydrogen atom or an alkyl group having 1 to 6 carbon atoms:

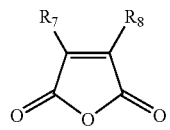

[Formula 2]

wherein $R_7$ and $R_8$ represent a hydrogen atom or an alkyl group having 1 to 6 carbon atoms, wherein the metal oxide is represented by the following Formula 4:

$M_xN_yO_z$ [Formula 4]

wherein M represents one or more selected from the group including alkali earth metal, transition metal, Group 13 metal, and Group 14 metal;
N represents a Group 5 or 6 atom;
O represents an oxygen atom; and
x, y and z represent values that are determined by an oxidation state of M and N with $x>0$, $y\geq 0$, and $z>0$.

8. The method of preparing the alkene-acrylate-unsaturated acid anhydride copolymer as set forth in claim 7, wherein a content of said acrylate monomer is in the range of 50 to 90 mole %.

9. The method of preparing the alkene-acrylate-unsaturated acid anhydride copolymer as set forth in claim 7, wherein said metal oxide comprises one or more selected from the group consisting of metal oxides such as aluminum oxide ($Al_2O_3$), yttrium oxide ($Y_2O_3$), zinc oxide ($ZrO_2$), halfnium oxide ($HfO_2$), silicon oxide ($SiO_2$), boron oxide ($B_2O_3$), cesium oxide ($CeO_2$), dysprosium oxide ($Dy_2O_3$), erbium oxide ($Er_2O_3$), europium oxide ($Eu_2O_3$), gadolinium oxide ($Gd_2O_3$), holmium oxide ($Ho_2O_3$), lanthanum oxide ($La_2O_3$), lutetium oxide ($Lu_2O_3$), neodymium oxide ($Nd_2O_3$), praseodymium oxide ($Pr_6O_{11}$), samarium oxide ($Sm_2O_3$), terbium oxide ($Tb_2O_3$), thorium oxide ($Th_4O_7$), thulium oxide ($Tm_2O_3$), ytterbium oxide ($Yb_2O_3$), tin oxide (SnO), and titanium oxide ($TiO_2$); and complex metal oxides such as dysprosium aluminate ($Dy_3Al_5O_{12}$), yttrium aluminate ($Y_3Al_5O_{12}$), aluminum titanate ($Al_2O_3.TiO_2$), aluminum silicate ($3Al_2O_3.2SiO_2$), calcium titanate ($CaTiO_3$), calcium zirconate ($CaZrO_3$), iron titanate ($FeTiO_3$), magnesium aluminate ($MgO.Al_2O_3$), cesium aluminate ($CeAl_{11}O_{18}$), $Al_2(SO_4)_3$, and $AlPO_4$.

10. The method of preparing the alkene-acrylate-unsaturated acid anhydride copolymer as set forth in claim 7, wherein said metal oxide be used in an amount of 0.01 to 200 mole % based on the acrylate comonomer.

11. The method of preparing the alkene-acrylate-unsaturated acid anhydride copolymer as set forth in claim 7, wherein a reaction condition for polymerization is performed under the temperature condition in the range of 30 to 150° C.

12. The method of preparing the alkene-acrylate-unsaturated acid anhydride copolymer as set forth in claim 7, wherein copolymer has a glass transition temperature (Tg) in the range of 100 to 180° C.

13. The method of preparing the alkene-acrylate-unsaturated acid anhydride copolymer as set forth in claim 7, wherein said copolymer has a number average molecular weight in the range of 5,000 to 400,000 or a weight average molecular weight in the range of 10,000 to 800,000.

14. The method of preparing the alkene-acrylate-unsaturated acid anhydride copolymer as set forth in claim 7, wherein said alkene is ethylene or propylene, and said polymerization reaction be performed under pressure in the range of 5 to 200 atm.

15. The method of preparing the alkene-acrylate-unsaturated acid anhydride copolymer as set forth in claim 7, wherein said acrylate monomer comprises alkyl acrylate including a straight- or branched-chained alkyl group having 1 to 12 carbon atoms, alkyl methacrylate including a straight- or branched-chained alkyl group having 1 to 12 carbon atoms, or alkyl butacrylate including a straight- or branched-chained alkyl group having 1 to 12 carbon atoms.

16. An optical film comprising: the alkene-acrylate-unsaturated acid anhydride copolymer of claim 1.

17. An optical film comprising: the alkene-acrylate-unsaturated acid anhydride copolymer of claim 7.

\* \* \* \* \*